(12) United States Patent
Takada et al.

(10) Patent No.: US 11,305,272 B2
(45) Date of Patent: Apr. 19, 2022

(54) ION EXCHANGER FILLED CARTRIDGE AND METAL REMOVING COLUMN

(71) Applicant: ORGANO CORPORATION, Tokyo (JP)

(72) Inventors: Noriko Takada, Tokyo (JP); Akira Nakamura, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 216 days.

(21) Appl. No.: 16/469,060

(22) PCT Filed: Nov. 10, 2017

(86) PCT No.: PCT/JP2017/040629
§ 371 (c)(1),
(2) Date: Jun. 12, 2019

(87) PCT Pub. No.: WO2018/110177
PCT Pub. Date: Jun. 21, 2018

(65) Prior Publication Data
US 2020/0070141 A1    Mar. 5, 2020

(30) Foreign Application Priority Data

Dec. 13, 2016 (JP) .............................. JP2016-240899

(51) Int. Cl.
*B01D 15/10* (2006.01)
*B01D 15/36* (2006.01)
(Continued)

(52) U.S. Cl.
CPC ............ *B01J 47/024* (2013.01); *B01D 15/10* (2013.01); *B01D 15/361* (2013.01); *B01J 39/05* (2017.01);
(Continued)

(58) Field of Classification Search
CPC ........ B01J 47/02; B01J 47/022; B01J 47/024; B01J 47/026; B01J 47/04; B01J 39/05;
(Continued)

(56) References Cited

U.S. PATENT DOCUMENTS 3,791,522 A * 2/1974 Eisenbeiss ......... G01N 30/6017
210/198.2
4,554,071 A * 11/1985 Ruijten .................. G01N 30/08
210/198.2
(Continued)

FOREIGN PATENT DOCUMENTS

JP    61-187287    11/1986
JP    2-131185    5/1990
(Continued)

OTHER PUBLICATIONS

Machine translation of JP 2011-200818, originally published Oct. 13, 2011, 6 pages. (Year: 2011).*
(Continued)

*Primary Examiner* — Benjamin L Lebron
(74) *Attorney, Agent, or Firm* — Greenblum & Bernstein, P.L.C.

(57) ABSTRACT

An ion exchanger filled cartridge accommodated inside an accommodating container of a metal removing column and in which an ion exchanger is filled is provided. The ion exchanger filled cartridge includes a cylinder portion, an upper lid in which a through hole for a liquid to be treated is formed and which is provided on an upper end of the cylinder portion, a lower lid in which a through hole for a treated liquid is formed and which is provided on a lower end of the cylinder portion, an insertion pipe connected to the lower lid, having an O-ring attached to an outer side, and inserted into a treated liquid discharge pipe provided on a bottom portion of the accommodating container of the metal removing column, and the ion exchanger filled inside the cylinder portion.

8 Claims, 14 Drawing Sheets

(51) Int. Cl.
| | |
|---|---|
| *B01J 39/20* | (2006.01) |
| *B01J 47/024* | (2017.01) |
| *B01J 39/05* | (2017.01) |
| *B01J 39/07* | (2017.01) |
| *B01J 41/05* | (2017.01) |
| *B01J 41/07* | (2017.01) |
| *B01J 41/14* | (2006.01) |
| *B01J 47/026* | (2017.01) |
| *B01J 47/04* | (2006.01) |
| *C02F 1/42* | (2006.01) |

(52) U.S. Cl.
CPC ............... *B01J 39/07* (2017.01); *B01J 39/20* (2013.01); *B01J 41/05* (2017.01); *B01J 41/07* (2017.01); *B01J 41/14* (2013.01); *B01J 47/026* (2013.01); *B01J 47/04* (2013.01); *C02F 1/42* (2013.01)

(58) Field of Classification Search
CPC ... B01J 39/07; B01J 39/20; B01J 41/05; B01J 41/07; B01J 41/14; G01N 30/60; G01N 30/6004; G01N 30/6017; G01N 30/603; G01N 30/6091; G01N 30/6047; G01N 30/6065; G01N 30/606; B01D 15/10; B01D 15/361; C02F 1/42
See application file for complete search history.

(56) References Cited

U.S. PATENT DOCUMENTS

| | | | | |
|---|---|---|---|---|
| 5,169,522 A * | 12/1992 | Shalon | ............... | B01D 15/08 210/198.2 |
| 5,271,837 A * | 12/1993 | Discepolo | ............... | B01J 39/04 210/282 |
| 5,626,750 A * | 5/1997 | Chinn | ............... | B01J 47/022 210/275 |
| 5,707,536 A * | 1/1998 | Meissner | ............... | B01D 24/12 210/807 |
| 6,733,637 B1 | 5/2004 | Burton et al. | | |
| 8,580,560 B1 * | 11/2013 | Ellis | ............... | B01L 3/5635 435/297.1 |
| 2002/0110495 A1 * | 8/2002 | Hunt | ............... | B01J 20/281 422/400 |
| 2006/0157416 A1 | 7/2006 | Seidel et al. | | |
| 2007/0248853 A1 * | 10/2007 | Ukai | ............... | C02F 1/288 429/410 |
| 2008/0308498 A1 * | 12/2008 | Davis | ............... | B01D 15/22 210/656 |
| 2015/0144557 A1 | 5/2015 | Ly et al. | | |
| 2016/0089618 A1 | 3/2016 | Ogura et al. | | |
| 2016/0144355 A1 * | 5/2016 | Bortun | ............... | C02F 1/288 252/184 |
| 2016/0164118 A1 * | 6/2016 | Nakagaki | ............... | H01M 8/04029 429/437 |
| 2016/0187306 A1 * | 6/2016 | Pohl | ............... | G01N 30/14 436/178 |
| 2017/0368547 A1 * | 12/2017 | Ohira | ............... | C02F 1/42 |

FOREIGN PATENT DOCUMENTS

| | | |
|---|---|---|
| JP | 9-271770 | 10/1997 |
| JP | 2004-41854 | 2/2004 |
| JP | 2006-527080 | 11/2006 |
| JP | 2011-200818 | 10/2011 |
| JP | 4801870 | 10/2011 |
| JP | 2015-521101 | 7/2015 |
| JP | 2016-64373 | 4/2016 |
| TW | 201442754 A | 11/2014 |
| TW | I476052 B | 3/2015 |
| TW | I556865 B | 11/2016 |

OTHER PUBLICATIONS

Office Action issued in Korean Patent Application No. 10-2019-7010806 dated Jul. 29, 2020 and English Translation thereof.
Official Communication issued in International Application No. PCT/JP2017/040629, dated Jan. 9, 2018 and English language translation thereof.
Office Action issued in corresponding Taiwanese Patent Application No. 106142486 dated Mar. 8, 2021, along with English Translation thereof.

* cited by examiner

ION EXCHANGER FILLED CARTRIDGE AND METAL REMOVING COLUMN

TECHNICAL FIELD

The present invention relates to a metal removing column for removing trace metal in an organic solvent and an ion exchanger filled cartridge used for the same.

BACKGROUND ART

As an art for removing the trace metal in a liquid to be treated, an art in which an ion exchange resin is filled in a cartridge and the liquid to be treated is directly passed through the cartridge so as to obtain a treated liquid and an art in which the ion exchange resin is filled in the cartridge, an accommodating container covering it is further provided, the liquid to be treated passes between the cartridge and the accommodating container and then, passes through the cartridge so as to obtain the treated liquid are known (Patent Literature 1, Patent Literature 2, Patent Literature 3).

Since such refinement using the cartridge in which the ion exchange resin is filled can be realized with a small plant investment, demand is increasing not only in manufacture of pure water but also in solvent refinement such as IPA (isopropanol), PGMEA (propylene glycol monomethyl ether acetate), PGME (propylene glycol monomethyl ether), PGEE (propylene glycol monoethyl ether) and the like or particularly in refinement of high purity solvent.

Moreover, in order to reduce impurities in the organic solvent to a ppt level, refinement by the ion exchange resin is needed.

CITATION LIST

Patent Literature

[Patent Literature 1] Japanese Patent Laid-Open No. 9-271770
[Patent Literature 2] Japanese Patent No. 4801870
[Patent Literature 3] Japanese Patent Laid-Open No. 2004-41854

SUMMARY OF INVENTION

Technical Problem

However, these prior arts have a problem that when the ion exchange resin in the cartridge is to be replaced after the ion exchange resin comes to the end of life, or when the cartridge in which the ion exchange resin is filled is to be replaced, impurities are mixed in a refinement system, and the treated liquid is contaminated.

Therefore, an object of the present invention is to provide a metal removing column in which the impurities are not mixed in the refinement system, and the treated liquid is not contaminated when the cartridge in which the ion exchanger is filled is to be replaced and an ion exchanger filled cartridge used for the same.

Solution to Problem

The problem as above is solved by the following present invention:

That is, the present invention (1) provides an ion exchanger filled cartridge accommodated inside an accommodating container of a metal removing column and in which an ion exchanger is filled, including:
a cylinder portion;
an upper lid in which a through hole for a liquid to be treated is formed and which is provided on an upper end of the cylinder portion;
a lower lid in which a through hole for a treated liquid is formed and which is provided on a lower end of the cylinder portion;
an insertion pipe connected to the lower lid, having an O-ring attached to an outer side, and inserted into a treated liquid discharge pipe provided on a bottom portion of the accommodating container of the metal removing column; and
the ion exchanger filled inside the cylinder portion.

Moreover, the present invention (2) provides an ion exchanger filled cartridge in (1), in which the cylinder portion is made of polytetrafluoroethylene (PTFE).

Moreover, the present invention (3) provides an ion exchanger filled cartridge in (1) or (2), in which an upper-end side pipe-diameter reducing portion whose inner diameter of the cylinder portion decreases as it goes toward the upper end of the cylinder portion and a lower-end side pipe-diameter reducing portion whose inner diameter of the cylinder portion decreases as it goes toward the lower end of the cylinder portion are formed inside the cylinder portion.

Moreover, the present invention (4) provides an ion exchanger filled cartridge in any one of (1) to (3), including an upper-lid sandwiching member in which a passage port for the liquid to be treated is formed and an upper-lid side ion exchanger outflow preventing member, in which the upper-lid side ion exchanger outflow preventing member is sandwiched between the upper lid and the upper-lid sandwiching member.

Moreover, the present invention (5) provides an ion exchanger filled cartridge in (4), in which
the upper-lid sandwiching member is made of an O-shaped outer side portion having a thread or a screw groove formed on an outer peripheral surface and a cross-shaped or X-shaped inner side portion provided on an inner side in a radial direction of the outer side portion;
the upper lid has an upper-lid sandwiching member fixing portion having a screw groove or a thread screwed with a thread or a screw groove of the upper-lid sandwiching member formed on an inner peripheral surface; and
the upper-lid sandwiching member is screwed with the upper-lid sandwiching member fixing portion.

Moreover, the present invention (6) provides an ion exchanger filled cartridge in any one of (1) to (5), including a lower-lid sandwiching member in which a passage port for the treated liquid is formed and a lower-lid side ion exchanger outflow preventing member, in which the lower-lid side ion exchanger outflow preventing member is sandwiched between the lower lid and the lower-lid sandwiching member.

Moreover, the present invention (7) provides an ion exchanger filled cartridge in (6), in which
the lower-lid sandwiching member is made of an O-shaped outer side portion having a thread or a screw groove formed on an outer peripheral surface and a cross-shaped or X-shaped inner side portion provided on an inner side in a radial direction of the outer side portion;
the lower lid has a lower-lid side sandwiching member fixing portion having a screw groove or a thread screwed with a thread or a screw groove of the lower-lid sandwiching member formed on an inner peripheral surface; and the lower-lid sandwiching member is screwed with the lower-lid side sandwiching member fixing portion.

Moreover, the present invention (8) provides a metal removing column including:

an accommodating container;

a supply port for liquid to be treated formed in the accommodating container and supplying a liquid to be treated into the accommodating container;

a treated liquid discharge pipe attached to a bottom side of the accommodating container and communicating with the inside of the accommodating container; and the ion exchanger filled cartridge according to any one of (1) to (7) accommodated inside the accommodating container, in which the insertion pipe is inserted into the treated liquid discharge pipe, and an O-ring attached to an outer side of the insertion pipe is brought into close contact with an inner wall of the treated liquid discharge pipe and the outer side of the insertion pipe so that a space between the inner wall of the treated liquid discharge pipe and the outer side of the insertion pipe is sealed.

Advantageous Effect of Invention

According to the present invention, when a cartridge in which the ion exchangers are filled is to be replaced, the metal removing column in which impurities are not mixed in the refinement system, and the treated liquid is not contaminated can be provided. Moreover, according to the present invention, an ion exchanger filled cartridge used for the metal removing column can be provided.

BRIEF DESCRIPTION OF DRAWINGS

FIG. 9 is a perspective view illustrating each member constituting an ion exchanger filled cartridge 20a.

DESCRIPTION OF EMBODIMENT

Figure 1:
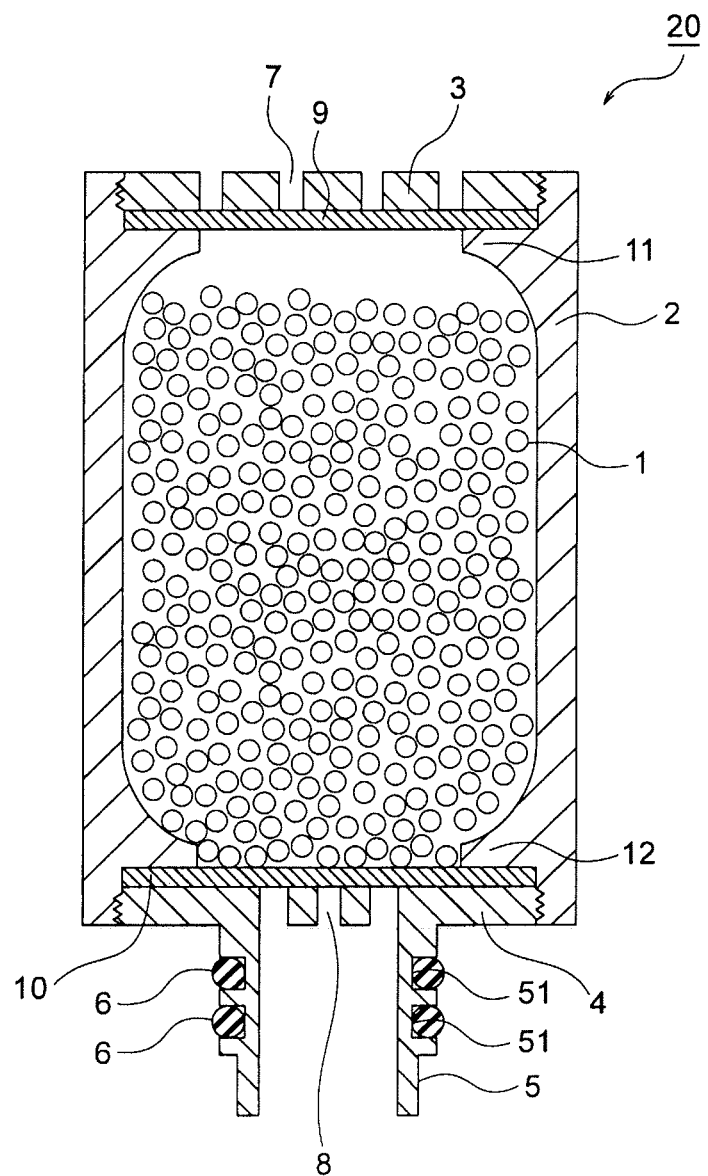
FIG. 1 is an end surface view illustrating an embodiment of an ion exchanger filled cartridge of the present invention.

The ion exchanger filled cartridge 20 illustrated in FIG. 1 is a cartridge replaceably mounted on a metal removing column for removing metal in an organic solvent by an ion exchanger. The ion exchanger filled cartridge 20 has a cylinder portion 2 in which granular ion exchange resin 1 is filled, an upper lid 3 having a through hole 7 for a liquid to be treated, formed and provided on an upper end of the cylinder portion 2, a lower lid 4 having a through hole 8 for a treated liquid, formed and provided on a lower end of the cylinder portion 2, an insertion pipe 5 connected to the lower lid and inserted into a treated liquid discharge pipe provided on a bottom portion of an accommodating container of the metal removing column, and the granular ion exchange resin 1 filled inside the cylinder portion 2. A groove 51 for attaching O-ring is formed on an outer side of the insertion pipe 5 in order to seal a space between an inner wall of the treated liquid discharge pipe of the metal removing column and the insertion pipe 5 of the ion exchanger filled cartridge 20. An O-ring 6 is provided by being fitted in the groove 51 for attaching the O-ring. In an embodiment illustrated in FIG. 1, granular ion exchange resin is filled as ion exchanger. Moreover, in the embodiment illustrated in FIG. 1, the lower lid 4 and the insertion pipe 5 are integrally molded. Moreover, an upper-end side pipe-diameter reducing portion 11 is formed on an upper end side on an inner side of the cylinder portion 2, and a lower-end side pipe-diameter reducing portion 12 is formed on a lower end side on the inner side of the cylinder portion 2. In order to prevent outflow of the ion exchanger 1 from the cylinder portion 2 to the outside, a mesh 9 is provided by having an outer edge portion sandwiched between the upper-end side pipe-diameter reducing portion 11 and the upper lid 3 on an upper end of a filling region of the ion exchanger, and a mesh 10 is provided by having an outer edge portion sandwiched between the lower-end side pipe-diameter reducing portion 12 and the lower lid 4 on a lower end of the filling region of the ion exchanger. The mesh 9 and the mesh 10 have clearance of a size in such a degree that transmits the liquid to be treated and does not transmit the granular ion exchange resin 1.

Figure 2:
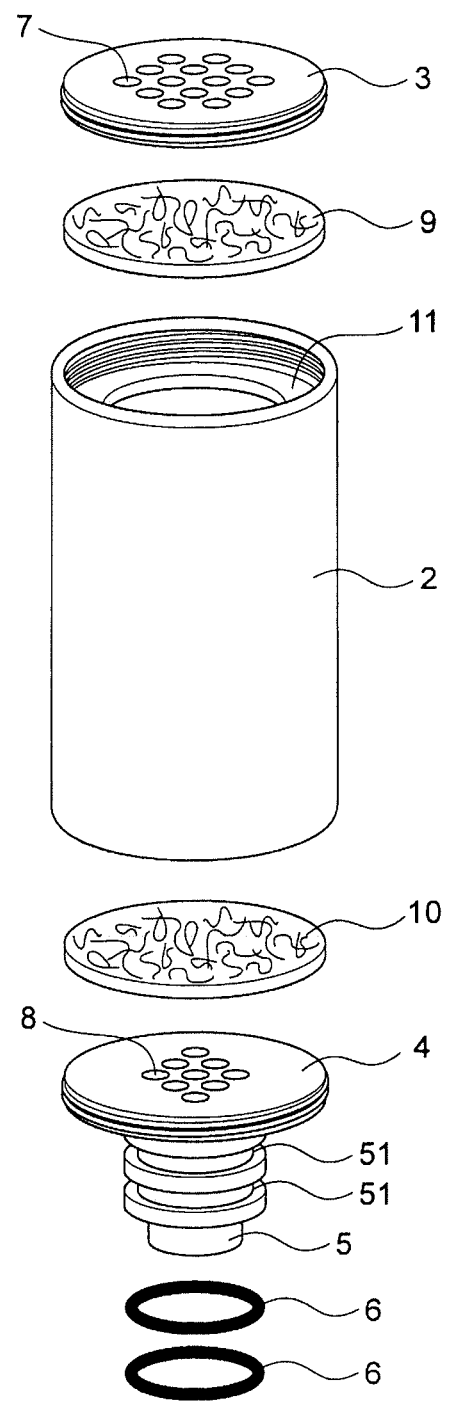
FIG. 2 is a perspective view illustrating each member constituting the ion exchanger filled cartridge 20 in FIG. 1.

As illustrated in FIG. 2, in assembling of the ion exchanger filled cartridge 20, first, the lower lid 4 formed integrally with the insertion pipe 5 is screwed and fitted in the lower end side of the cylinder portion 2 in a state where the mesh 10 is disposed on an inner side of the lower end of the cylinder portion 2. At this time, the mesh 10 has its outer edge portion sandwiched between the lower-end side pipe-diameter reducing portion 12 and the lower lid 4 and fixed. Subsequently, the granular ion exchange resin 1 (in the embodiment illustrated in FIG. 1, a granular ion exchange resin) is filled in the cylinder portion 2. Subsequently, the upper lid 3 is screwed and fitted in the upper end side of the cylinder portion 2 in a state where the mesh 9 is disposed on the inner side of the upper end of the cylinder portion 2. At this time, the mesh 9 has its outer edge portion sandwiched between the upper-end side pipe-diameter reducing portion 11 and the upper lid 3 and fixed. Subsequently, the O-ring 6 is attached to the groove 51 for attaching O-ring formed in the insertion pipe 5.

Figure 3:
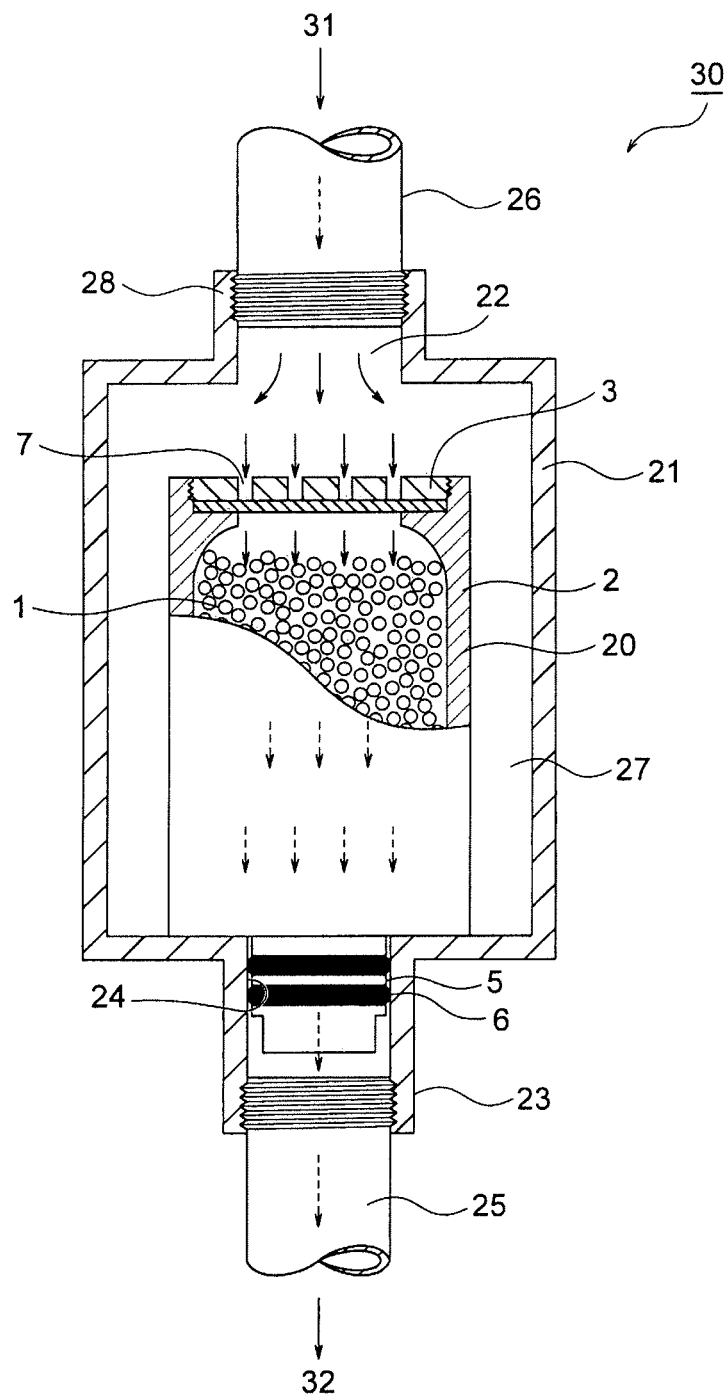
FIG. 3 is an end surface view illustrating an embodiment of a metal removing column of the present invention.

The ion exchanger filled cartridge 20 fabricated as above is installed in an accommodating container 21 of a metal removing column 30 as illustrated in FIG. 3, and the metal removing column 30 is assembled. The metal removing column 30 has the accommodating container 21, a supply port 22 for a liquid to be treated, formed in the accommodating container, and supplying the liquid to be treated into the accommodating container, a treated liquid discharge pipe 23 attached to the bottom side of the accommodating container 21 and communicating with an inside of the accommodating container 21, and the ion exchanger filled cartridge 20 accommodated in the accommodating container 21. And the insertion pipe 5 of the ion exchanger filled cartridge 20 is inserted into the treated liquid discharge pipe 23, and since the O-ring 6 attached to the outer side of the insertion pipe 5 is brought into close contact with an inner wall 24 of the treated liquid discharge pipe 23 and the outer side of the insertion pipe 5 of the ion exchanger filled cartridge 20, the space between the inner wall of the treated liquid discharge pipe 23 and the outer side of the insertion pipe 5 is sealed. Moreover, a connection pipe 28 is attached to the supply port 22 for the liquid to be treated. And a pipe end of a liquid feed pipe 26 for a liquid to be treated 31 is screwed into the connection pipe 28, and the liquid feed pipe 26 for the liquid to be treated 31 is connected to the connection pipe 28. Moreover, the pipe end of a liquid feed pipe 25 for a treated liquid 32 is screwed into the treated liquid discharge pipe 23, and the liquid feed pipe 25 for the treated liquid 32 is connected to the treated liquid discharge pipe 23.

A treatment method of the liquid to be treated using the metal removing column 30 will be described. In FIG. 3, the liquid to be treated 31 is conveyed from a storage tank or the like for the liquid to be treated 31 to the metal removing column 30 through a liquid feed pipe 26 for the liquid to be treated connected to the metal removing column 30 and is supplied into the accommodating container 21 of the metal removing column 30 through the supply port 22 for the liquid to be treated. The liquid to be treated 31 having been supplied into the accommodating container 21 first fills a space 27 between the cylinder portion 2 of the ion exchanger filled cartridge 20 and the accommodating container 21 of the metal removing column 30 and then, flows into the cylinder portion 2 of the ion exchanger filled cartridge 20 through the through hole 7 for the liquid to be treated, formed in the upper lid 3 of the ion exchanger filled cartridge 20. The liquid to be treated 31 having flowed into the cylinder portion 2 of the ion exchanger filled cartridge 20 passes through the filling region of the ion exchanger while in contact with the ion exchanger 1 filled in the cylinder portion 2, passes through the through hole (reference numeral 8 in FIG. 1) for the treated liquid, formed in the lower lid 4 of the cylinder portion 2, and then, is discharged to an outside of the cylinder portion 2 of the ion exchanger filled cartridge 20. The treated liquid 32 having been discharged to the outside of the cylinder portion 2 of the ion exchanger filled cartridge 20 is conveyed to a use point or the storage tank for the treated liquid through the liquid feed pipe 25 for the treated liquid, connected to the metal removing column 30.

The ion exchanger filled cartridge of the present invention is an ion exchanger filled cartridge accommodated in an accommodating container of a metal removing column and in which an ion exchanger is filled, having:

a cylinder portion;

an upper lid in which the through hole for a liquid to be treated is formed and which is provided on an upper end of the cylinder portion;

a lower lid in which a through hole for a treated liquid is formed and which is provided on a lower end of the cylinder portion;

an insertion pipe connected to the lower lid, having an O-ring attached to an outer side, and inserted into a treated liquid discharge pipe provided on a bottom portion of the accommodating container of the metal removing column; and the ion exchanger filled inside the cylinder portion.

The ion exchanger filled cartridge of the present invention is a component installed in the metal removing column for removing metal impurities in an organic solvent and for easily replacing the ion exchanger used for removal of the metal impurities in the organic solvent by replacing the cartridge installed in the metal removing column.

The organic solvent related to the ion exchanger filled cartridge of the present invention, that is, the liquids to be treated include IPA (isopropanol), PGMEA (propylene glycol monomethyl ether acetate), PGME (propylene glycol monomethyl ether), PGEE (propylene glycol monoethyl ether), NMP (N-methyl-2-pyrolidone) and the like. The impurities in the liquid to be treated include metal ions such as Li, Na, Mg, Al, K, Ca, Cr, Mn, Fe, Co, Ni, Cu, Cd, Pb and the like, anions such as Cl, $SO_4$, $NO_3$, $PO_4$, $CO_3$, $HCO_3$ and the like, organic acids such as formic acid, acetic acid, maleic acid, propionic acid and the like, and middle to high molecular mass compounds having positive or negative charges and the like.

The ion exchanger filled cartridge of the present invention has a cylinder portion, an upper lid, a lower lid, an insertion pipe, and an ion exchanger filled inside the cylinder portion.

The ion exchanger for removing the metal impurities present in the liquid to be treated is filled inside the cylinder portion of the ion exchanger filled cartridge of the present invention. The ion exchangers related to the ion exchanger filled cartridge of the present invention include a granular ion exchange resin, such as a granular cation exchange resin, a granular anion exchange resin, a combination of the granular cation exchange resin and the granular anion exchange resin and the like; a monolithic organic porous ion exchanger, such as a monolithic organic porous cation exchanger, a monolithic organic porous anion exchanger, a combination of the monolithic organic porous cation exchanger and the monolithic organic porous anion exchanger and the like; or a combination of the granular ion exchange resin and the monolithic organic porous ion exchanger. When the ion exchanger is a combination of the granular cation exchange resin and the granular anion exchange resin, there are a case where it is used as a mixed bed in which the granular cation exchange resin and the granular anion exchange resin are uniformly mixed and a case where it is used as a double bed in which the granular cation exchange resin is filled on the upstream side of the filling region of the ion exchanger and the granular anion exchange resin is filled on the downstream side of the filling region of the ion exchanger or the granular anion exchange resin is filled on the upstream side of the filling region of the ion exchanger and the granular cation exchange resin is filled on the downstream side of the filling region of the ion exchanger. Moreover, when the ion exchanger is a combination of the monolithic organic porous cation exchanger and the monolithic organic porous anion exchanger, it is used as a double bed in which the monolithic organic porous cation exchanger is filled on the upstream side of the filling region of the ion exchanger and the monolithic organic porous anion exchanger is filled on the downstream side of the filling region of the ion exchanger or the monolithic organic porous anion exchanger is filled on the upstream side of the filling region of the ion exchanger and the monolithic organic porous cation exchanger is filled on the downstream side of the filling region of the ion exchanger. When the ion exchanger is a combination of the granular ion exchange resin and the monolithic organic porous ion exchanger, the monolithic organic porous ion exchanger is filled on the upstream side of the filling region of the ion exchanger and the granular ion exchange resin is filled on the downstream side of the filling region of the ion exchanger.

The granular cation exchange resin may be a strong acid cation exchange resin, weak acid cation exchange resin or both. The strong acid cation exchange resins include Orlite® DS-1, Orlite® DS-4 and the like. Moreover, the weak acid cation exchange resins include Amberlite® IRC76 and the like.

The granular anion exchange resin may be a strong basic anion exchange resin, a weak basic anion exchange resin or both. The strong basic anion exchange resins include Orlite® DS-2, Orlite® DS-5 and the like. Moreover, the weak basic anion exchange resins include Orlite® DS-6 and the like.

An average grain size of the granular ion exchanger is not particularly limited but preferably 200 to 1000 μm or particularly preferably 400 to 800 μm. The average grain size of the ion exchanger is a value measured by a laser-diffraction type grain size distribution measuring device.

The monolithic organic porous ion exchangers are not particularly limited as long as an ion exchange group is introduced into the monolithic organic porous body but the monolithic organic porous ion exchangers shown below can be cited, for example.

As the monolithic organic porous ion exchanger, a monolithic organic porous ion exchanger (hereinafter, also described as a monolithic organic porous ion exchanger of a first form.) made of a continuous skeleton phase and a continuous pore phase and in which a thickness of the continuous skeleton is 1 to 100 μm, an average diameter of the continuous pore is 1 to 1000 μm, the total fine pore volume is 0.5 to 50 mL/g, a cation exchange group or an anion exchange group is introduced, an ion exchange volume per weight in a dry state is 1 to 6 mg equivalent/g, and the ion exchange group is uniformly distributed in the organic porous ion exchanger can be cited, for example.

The monolithic organic porous ion exchangers in the first form include a monolithic organic porous ion exchanger which is a continuous air-bubble structure in which air-bubble like macropores are overlapped with each other, and this overlapped portion becomes an opening having an average diameter of 1 to 1000 μm, the total fine pore volume is 1 to 50 mL/g, a cation exchange group or an anion exchange group is introduced, the ion exchange volume per weight in the dry state is 1 to 6 mg equivalent/g, and the ion exchange group is uniformly distributed in the organic porous ion exchanger.

Moreover, the monolithic organic porous ion exchangers in the first form include a monolithic organic porous ion exchanger which is a continuous macropore structural body in which air-bubble like macropores are overlapped with each other, and this overlapped portion becomes an opening having an average diameter of 30 to 300 μm, the total fine pore volume is 0.5 to 10 mL/g, a cation exchange group or an anion exchange group is introduced, the ion exchange volume per weight in the dry state is 1 to 6 mg equivalent/g, the ion exchange group is uniformly distributed in the organic porous ion exchanger, and a skeleton portion area appearing on a section in an SEM image on the sectional surface of the continuous macropore structural body (dry body) is 25 to 50% in an image region.

Moreover, the monolithic organic porous ion exchangers in the first form include a monolithic organic porous ion exchanger which is a bicontinuous structural body made of a three-dimensionally continuous skeleton having an average thickness of 1 to 60 μm and made of aromatic vinyl polymer containing 0.1 to 5.0 mol % of crosslinked structure unit in all the constituent units into which the ion exchange group is introduced and a three-dimensionally continuous pore having an average diameter of 10 to 200 μm between the skeletons, the total fine pore volume is 0.5 to 10 mL/g, a cation exchange group or an anion exchange group is introduced, the ion exchange volume per weight in the dry state is 1 to 6 mg equivalent/g, and the ion exchange group is uniformly distributed in the organic porous ion exchanger.

The cylinder portion related to the ion exchanger filled cartridge of the present invention is a cylindrical member in which the ion exchanger is filled. An inner diameter, an outer diameter and a length of the cylinder portion are selected as appropriate in accordance with the shape of the metal removing column in which the ion exchanger filled cartridge is installed.

The upper lid in which the through hole for the liquid to be treated is formed is provided on the upper end of the cylinder portion. A method for fixing the upper lid to the cylinder portion is not particularly limited and includes a method of fixing by screwing, a method of hooking a projection formed on one of components by the other and the like. The number of through holes formed in the upper lid and a diameter per hole are selected as appropriate.

The lower lid in which the through hole for the treated liquid is formed is provided on the lower end of the cylinder portion. A method for fixing the lower lid to the cylinder portion is not particularly limited and includes a method of fixing by screwing, a method of hooking a projection formed on one of components by the other and the like. The number of through holes formed in the lower lid and a diameter per hole are selected as appropriate.

The insertion pipe is connected to the lower lid. The insertion pipe is a member inserted into the treated liquid discharge pipe provided on the bottom portion of the accommodating container of the metal removing column. And when the ion exchanger filled cartridge of the present invention is installed in the metal removing column, the insertion pipe is inserted into the treated liquid discharge pipe provided on the bottom portion of the accommodating container of the metal removing column, and the ion exchanger filled cartridge is installed in the accommodating container of the metal removing column.

The O-ring is attached to the outer side of the insertion pipe. The space between the inner wall of the treated liquid discharge pipe of the metal removing column and the outer side of the insertion pipe of the ion exchanger filled cartridge is sealed by the O-ring attached to the outer side of the insertion pipe. A material of the O-ring is not particularly limited and includes fluorine rubber, silicone rubber, Kalrez, perfluoro, PFA coating and the like. Moreover, the number of O-rings to be attached is not particularly limited.

The cylinder portion, the upper lid, the lower lid, and the insertion pipe are made of the same material, and the material is not particularly limited and includes, for example, polytetrafluoroethylene (PTFE), tetrafluoroethylene perfluoroalkyl vinyl ether copolymer (PFA), tetrafluoroethylene ethylene copolymer (ETFE), low-density polyethylene, high-density polyethylene and the like. The material of the cylinder portion, the upper lid, the lower lid, and the insertion pipe is selected as appropriate in accordance with the type of the liquid to be treated, the type of a dissolved material and the like.

The lower lid and the insertion pipe may be connected by being integrally formed, or the lower lid and the insertion pipe fabricated separately may be connected by fixing the insertion pipe to the lower lid, for example, by screwing.

In the ion exchanger filled cartridge of the present invention, an ion exchanger outflow preventing member made of an unwoven cloth, a mesh or the like is attached to the upper end side and the lower end side of the filling region of the ion exchanger so that the ion exchanger filled inside the cylinder portion do not flow out of the cylinder portion. The ion exchanger outflow preventing member has a clearance of such a degree that transmits the liquid to be treated and does not transmit the ion exchanger.

A method of attaching the ion exchanger outflow preventing member is not particularly limited and as in an embodiment illustrated in FIG. 1, includes a method of sandwiching an outer edge and its vicinity of the ion exchanger outflow preventing member between the upper end surface of the upper-end side pipe-diameter reducing portion formed on the inner side of the cylinder portion and the upper lid or between the lower end surface of the lower-end side pipe-diameter reducing portion and the lower lid and a method of fixation by welding to the upper lid or to the lower lid, for example.

In the ion exchanger filled cartridge of the present invention, the upper-end side pipe-diameter reducing portion may be formed in the vicinity of the upper end on the inner side of the cylinder portion and the lower-end side pipe-diameter reducing portion may be formed in the vicinity of the lower end on the inner side of the cylinder portion. The upper-end side pipe-diameter reducing portion refers to a portion where the inner diameter of the cylinder portion decreases as it goes toward the upper end of the cylinder portion. Moreover, the lower-end side pipe-diameter reducing portion refers to a portion where the inner diameter of the cylinder portion decreases as it goes toward the lower end of the cylinder portion. Since the through hole for the liquid to be treated cannot be formed easily in the vicinity of the outer edge of the upper lid due to its structure, a corner on the upper lid side in the cylinder portion is a portion where a flow of the liquid to be treated is small. Thus, since the portion where the flow of the liquid to be treated at the corner on the upper lid side in the cylinder portion is small can be eliminated by forming the upper-end side pipe-diameter reducing portion in the vicinity of the upper end on the inner side of the cylinder portion, there is a merit that the filled ion exchanger can be used efficiently. Moreover, since the through hole for the treated liquid cannot be formed easily in the vicinity of the outer edge portion of the lower lid due to its structure, a corner on the lower lid side in the cylinder portion is a portion where a flow of the treated liquid is small. Thus, since the portion where the flow of the liquid to be treated at the corner on the lower lid side in the cylinder portion is small can be eliminated by forming the lower-end side pipe-diameter reducing portion in the vicinity of the lower end on the inner side of the cylinder portion, there is a merit that the filled ion exchanger can be used efficiently.

Moreover, when the used granular ion exchange resin is to be taken out of the used ion exchanger filled cartridge in order to replace the granular ion exchange resin of the used ion exchanger filled cartridge, since the upper-end side pipe-diameter reducing portion is formed in the vicinity of the upper end on the inner side of the cylinder portion, clogging of the granular ion exchange resin at the corner on the upper lid side in the cylinder portion which makes taking-out difficult can be prevented, and since the lower-end side pipe-diameter reducing portion is formed in the vicinity of the lower end on the inner side of the cylinder portion, clogging of the granular ion exchange resin at the corner on the lower lid side in the cylinder portion which makes taking-out difficult can be prevented.

If the material of the cylinder portion is a resin such as PFA, a molding die needs to be fabricated in order to form the upper-end side pipe-diameter reducing portion and the lower-end side pipe-diameter reducing portion on the inner side of the cylinder portion. On the other hand, if the material of the cylinder portion is PTFE, since the upper-end side pipe-diameter reducing portion and the lower-end side pipe-diameter reducing portion can be formed on the inner side of the cylinder portion, there is a merit that a molding die does not have to be fabricated when the material of the cylinder portion is PTFE.

A cap member may be detachably mounted on the cylinder portion on the upper end side and the lower end side of the ion exchanger filled cartridge of the present invention. In an embodiment illustrated in FIG. 4, an upper-side cap member 33a is mounted on the upper end side of the cylinder portion in the ion exchanger filled cartridge 20 so as to completely cover the through hole of the liquid to be treated, and a lower-side cap member 33b is mounted on the lower end side of the cylinder portion in the ion exchanger filled cartridge 20 so as to completely cover the through hole of the treated liquid and the port of the insertion pipe formed in the lower lid of the cylinder portion. Since the cap member is mounted on the upper end side and the lower end side of the ion exchanger filled cartridge of the present invention, and the inside of the cylinder portion of the ion exchanger filled cartridge of the present invention is shut off from an outside air, impurities in the outside air is prevented from being mixed in the cylinder portion.

The material of the cap member is not particularly limited and includes polytetrafluoroethylene (PTFE), tetrafluoroethylene perfluoroalkyl vinyl ether copolymer (PFA), tetrafluoroethylene ethylene copolymer (ETFE), low-density polyethylene, high-density polyethylene and the like.

Figure 4:
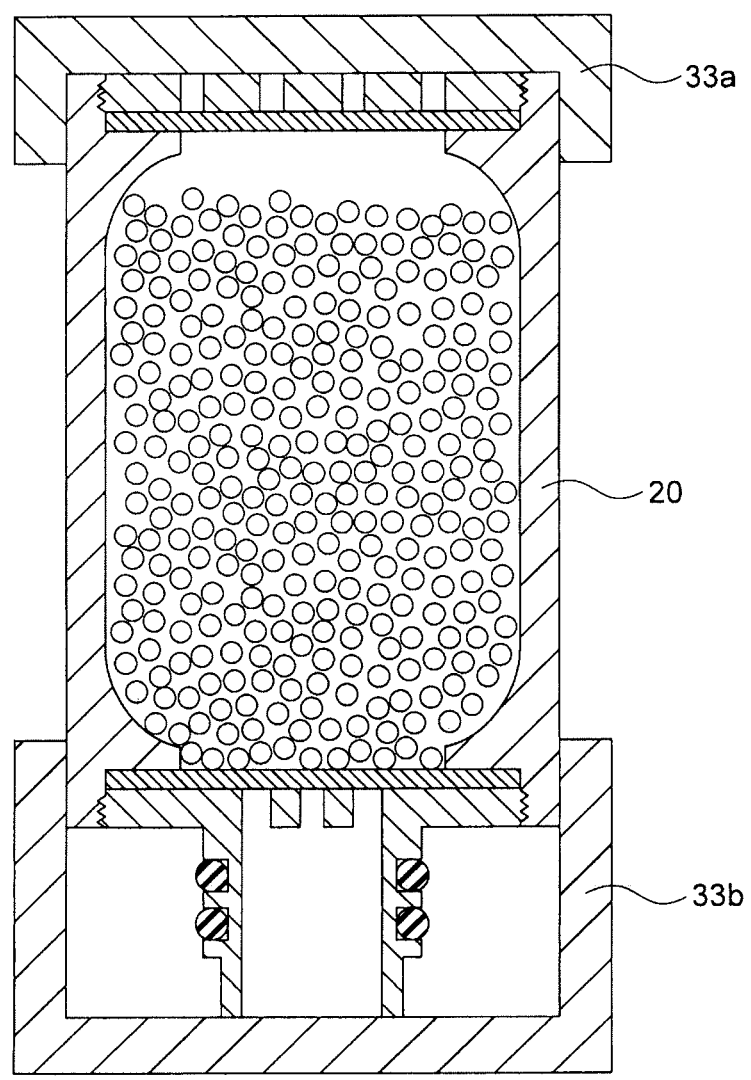
FIG. 4 is a schematic end surface view illustrating an embodiment in which a cap member is mounted on the ion exchanger filled cartridge of the present invention.

A method of mounting the cap member on the upper end side and the lower end side of the ion exchanger filled cartridge of the present invention is not particularly limited and includes a method of mounting by a friction force between the outer side of the cylinder portion and the inner side of the cap member as in the embodiment illustrated in FIG. 4, a method of mounting by providing a projection and a recess for fitting on the cylinder portion and the cap member and by fitting them and the like.

In the ion exchanger filled cartridge of the present invention, a method of attaching the ion exchanger outflow preventing member on the upper lid side includes a method of sandwiching the upper-lid side ion exchanger outflow preventing member by the upper lid and the upper-lid sandwiching member in which the passage port for the liquid to be treated is formed and fixing it. That is, as the embodiment of the ion exchanger filled cartridge of the present invention, the ion exchanger filled cartridge in which the upper-lid sandwiching member and the upper-lid side ion exchanger outflow preventing member are provided, and the upper-lid side ion exchanger outflow preventing member is sandwiched between the upper lid and the upper-lid sandwiching member can be cited (hereinafter, it is also described as a first embodiment of the ion exchanger filled cartridge of the present invention).

Figure 5:
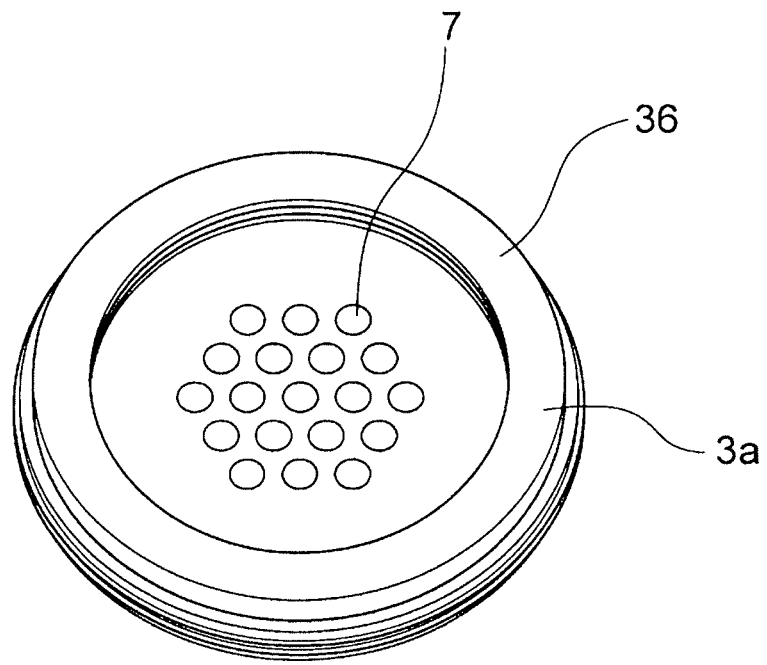
FIG. 5 is a schematic perspective view illustrating an embodiment of an upper lid having an upper-lid sandwiching member and an upper-lid sandwiching member fixing portion.
Figure 5:
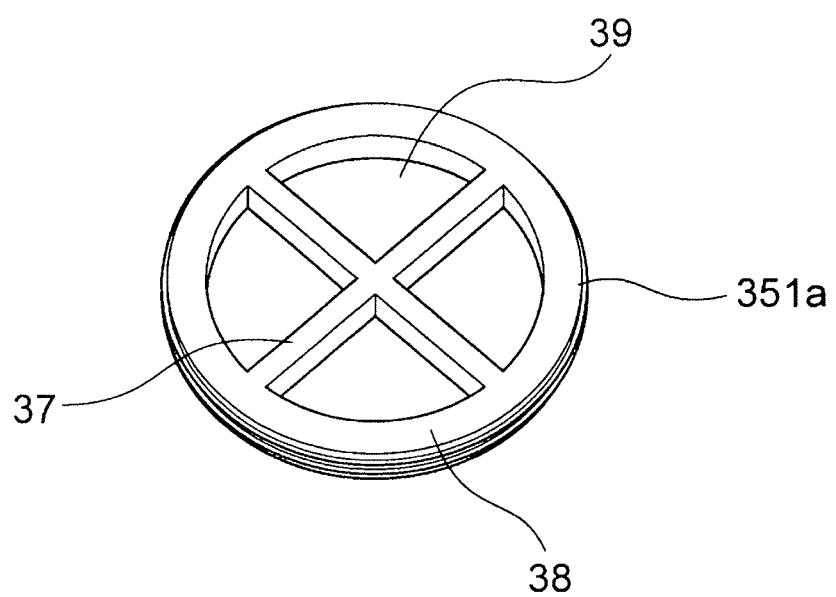
Figure 6:
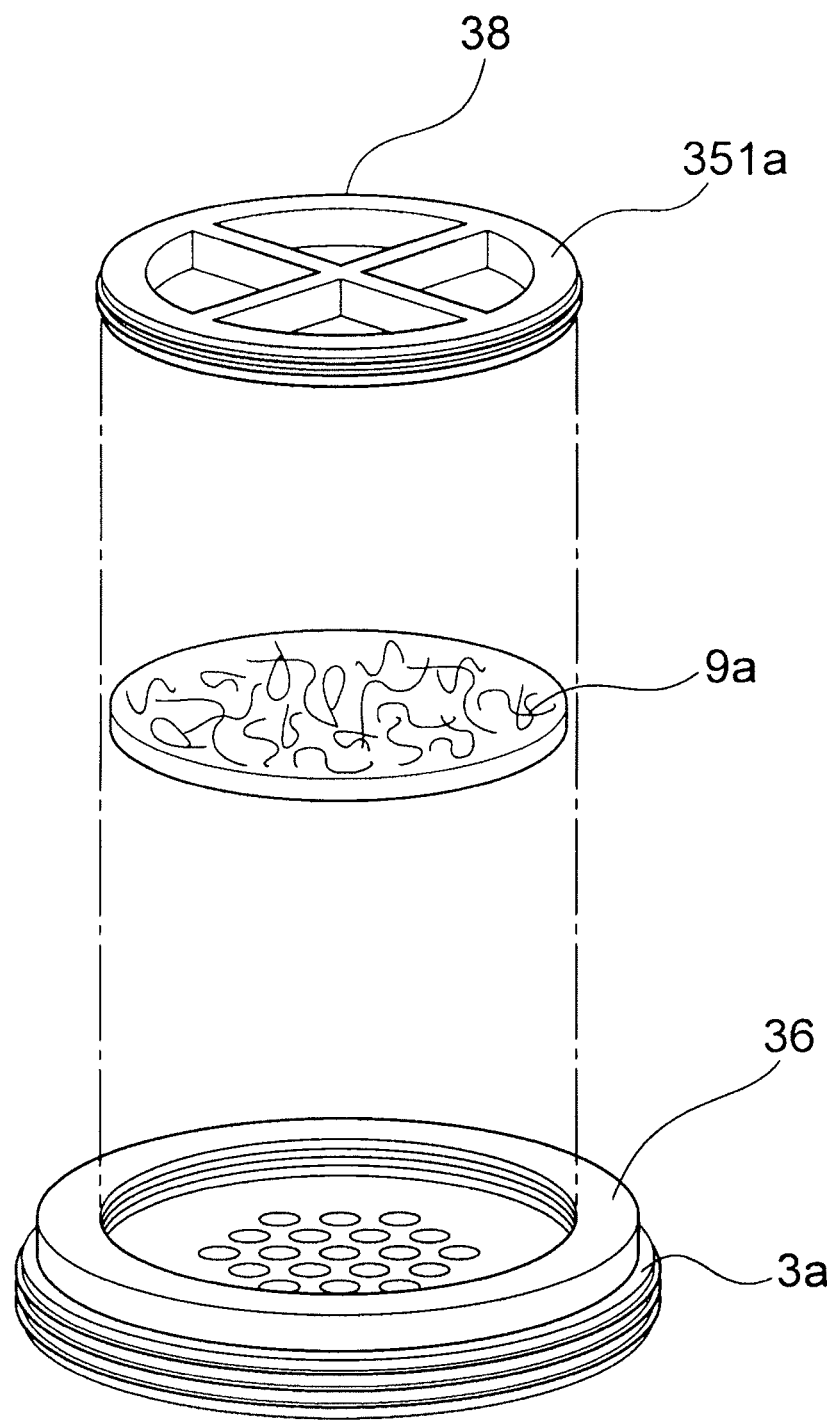
FIG. 6 is a schematic perspective view illustrating a state where an upper-lid side ion exchanger outflow preventing member is sandwiched by the upper lid having the upper-lid sandwiching member and the upper-lid sandwiching member fixing portion illustrated in FIG. 5.
Figure 7:
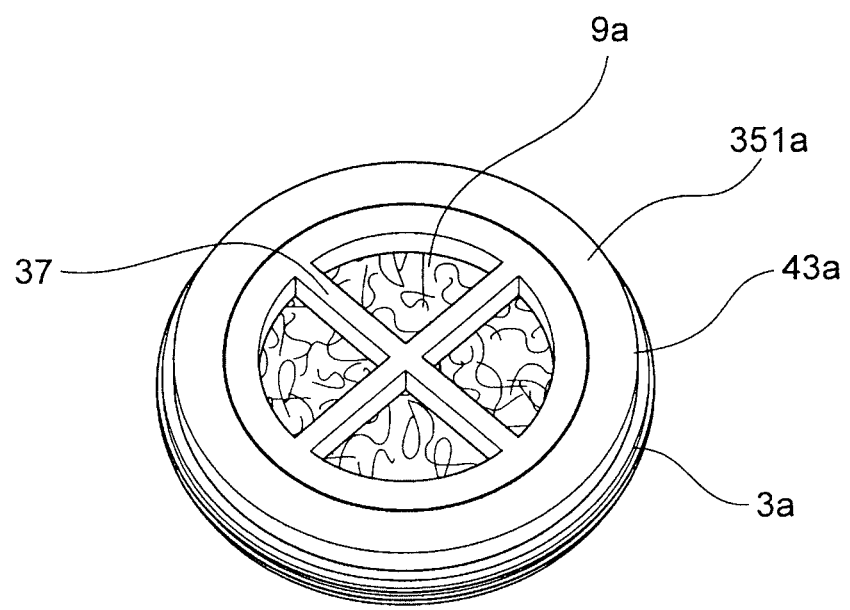
FIG. 7 is a schematic perspective view illustrating a state where an upper-lid side ion exchanger outflow preventing member is sandwiched and fixed by the upper lid having the upper-lid sandwiching member and the upper-lid sandwiching member fixing portion illustrated in FIG. 5.

As a method of attaching the ion exchanger outflow preventing member on the upper lid side in the first embodiment of the ion exchanger filled cartridge of the present invention, examples illustrated in FIGS. 5 to 7 are cited, for example. In FIGS. 5 to 7, a mesh 9a is sandwiched by an upper-lid sandwiching member 351a made of an O-shaped outer side portion 38 having a thread formed on an outer peripheral surface and a cross-shaped inner side portion 37 provided on an inner side in the radial direction of the outer side portion 38 and an upper lid 3a having an upper-lid sandwiching member fixing portion 36 in which a screw groove meshed with the thread of the upper-lid sandwiching member 351a is formed on an inner peripheral surface, protruding in an O-shape, and the upper-lid sandwiching member 351a is screwed and fixed to the upper-lid sandwiching member fixing portion 36 so that the mesh 9a is sandwiched and fixed by the upper lid 3a and the upper-lid sandwiching member 351a. In the upper-lid sandwiching member 351a, a passage port 39 for the liquid to be treated is formed by the cross-shaped inner side portion 37 and the O-shaped outer side portion 38 surrounding the cross-shaped inner side portion 37. Moreover, a through hole 7 for the liquid to be treated is formed in the upper lid 3a.

Figure 9:
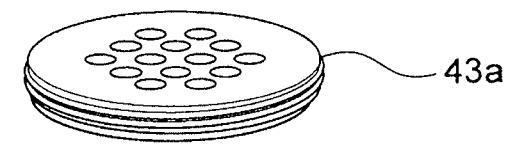
Figure 9:
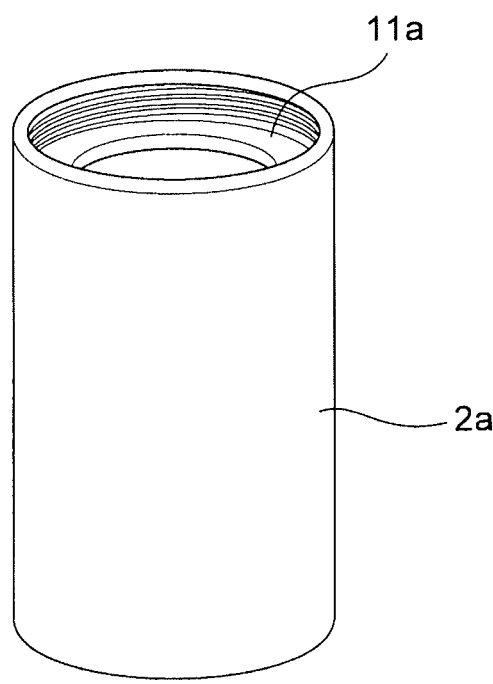
Figure 9:
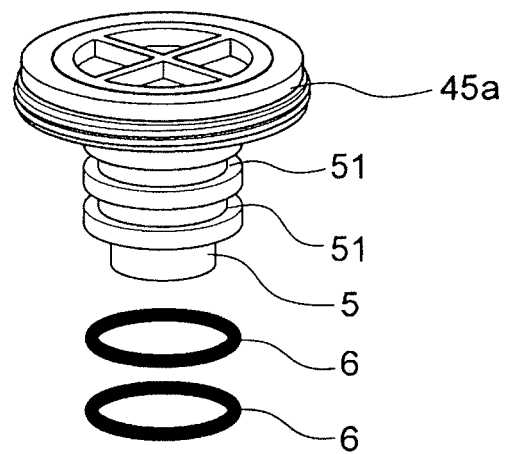
Figure 10:
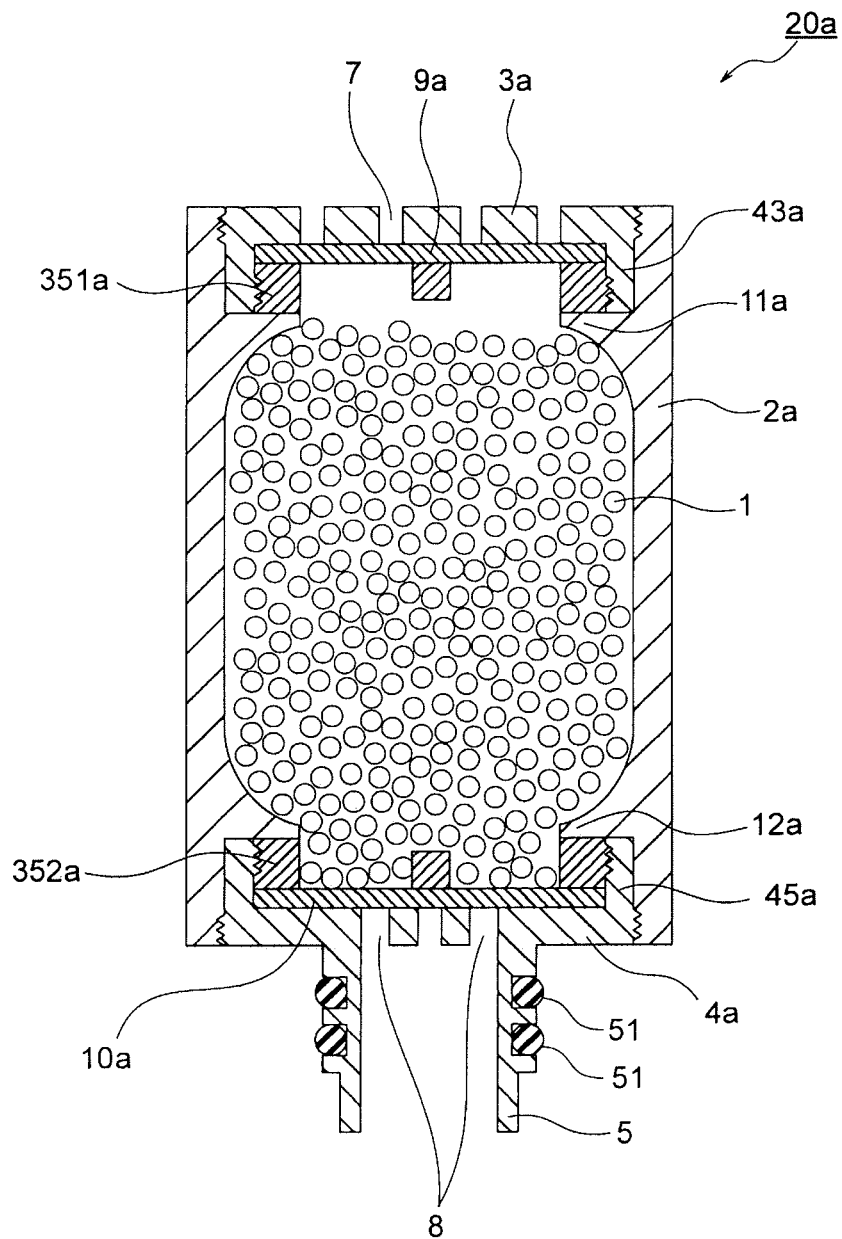
FIG. 10 is an end surface view illustrating an embodiment of the metal removing column of the present invention.

And as illustrated in FIGS. 9 and 10, a mesh-fixing upper lid body 43a made of the upper lid 3a, the upper-lid sandwiching member 351a screwed and fixed to the upper lid 3a, and the mesh 9a sandwiched and fixed by the upper lid 3a and the upper-lid sandwiching member 351a is screwed and fitted into the upper end side of the cylinder portion 2a.

Moreover, as a method of attaching the ion exchanger outflow preventing member on the lower lid side, a method of sandwiching and fixing the lower-lid side ion exchanger outflow preventing member by the lower lid and the lower-lid sandwiching member in which the passage port for the treated liquid is formed can be cited. That is, as an embodiment of the ion exchanger filled cartridge of the present invention, the ion exchanger filled cartridge in which the lower-lid sandwiching member and the lower-lid side ion exchanger outflow preventing member are provided, and the lower-lid side ion exchanger outflow preventing member is sandwiched between the lower lid and the lower-lid sandwiching member can be cited (hereinafter, it is also described as a second embodiment of the ion exchanger filled cartridge of the present invention).

Figure 8:
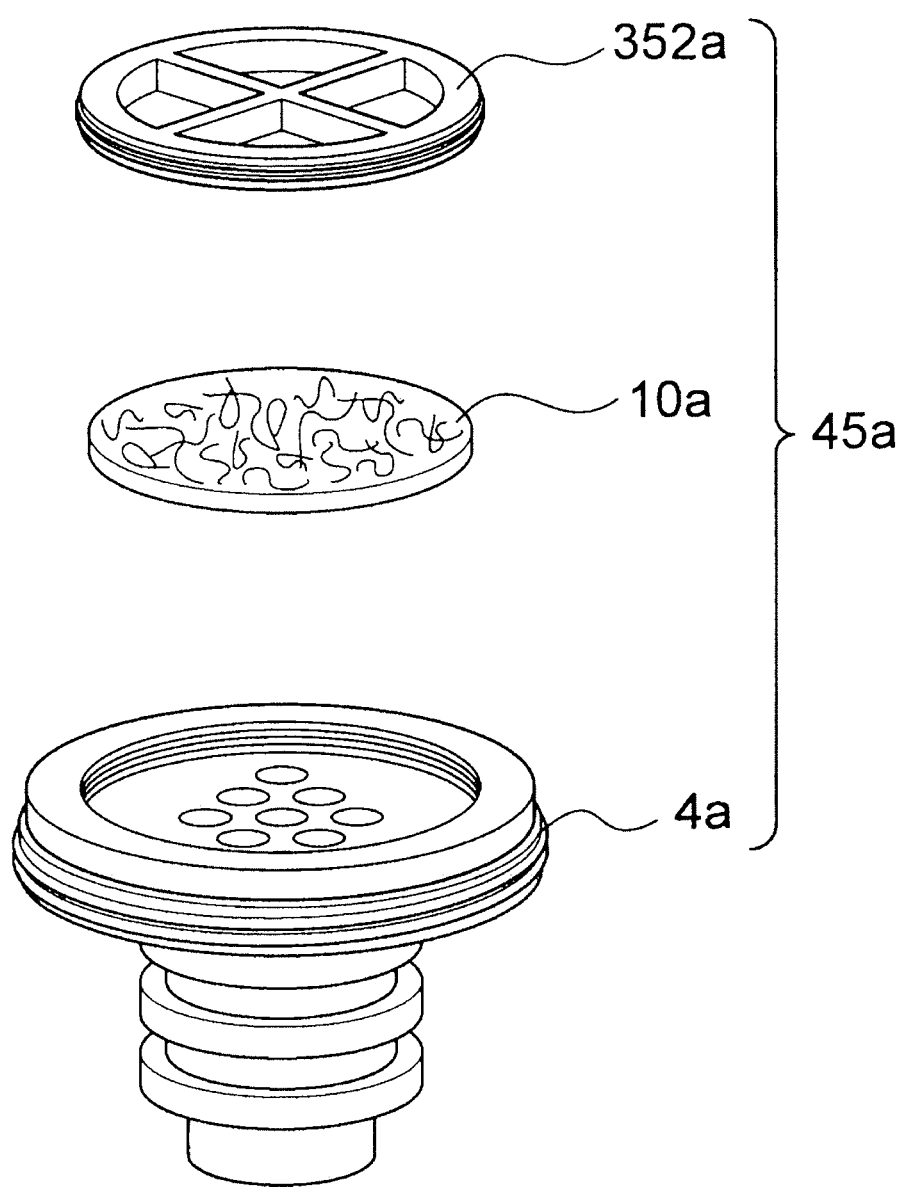
FIG. 8 is a schematic perspective view illustrating a state where a lower-lid side ion exchanger outflow preventing member is sandwiched by a lower lid having a lower-lid sandwiching member and a lower-lid side sandwiching member fixing portion.

As a method of attaching the ion exchanger outflow preventing member on the lower lid side in the second embodiment of the ion exchanger filled cartridge of the present invention, an example illustrated in FIG. 8 is cited, for example. In FIG. 8, a mesh 10a is sandwiched by a lower-lid side sandwiching member 352a made of an O-shaped outer side portion having a thread formed on an outer peripheral surface and a cross-shaped inner side portion provided on an inner side in the radial direction of the outer side portion and a lower lid 4a having a lower-lid side sandwiching member fixing portion in which a screw groove meshed with the thread of the lower-lid sandwiching member 352a is formed on an inner peripheral surface, protruding in an O-shape, and the lower-lid sandwiching member 352a is screwed and fixed to the lower-lid side sandwiching member fixing portion of the lower lid 4a so that the mesh 10a is sandwiched and fixed by the lower lid 4a and the lower-lid sandwiching member 352a. In the lower-lid side sandwiching member 352a, a passage port 39 for the treated liquid is formed by the cross-shaped inner side portion and the O-shaped outer side portion surrounding the cross-shaped inner side portion. Moreover, a through hole for the treated liquid is formed in the lower lid 4a.

And as illustrated in FIGS. 9 and 10, a mesh-fixing lower lid body 45a made of the lower lid 4a, the lower-lid sandwiching member 352a screwed and fixed to the lower lid 4a, and the mesh 10a sandwiched and fixed by the lower lid 4a and the lower-lid sandwiching member 352a is screwed and fitted into the lower end side of the cylinder portion 2a.

FIG. 10 illustrates an ion exchanger filled cartridge 20a having the mesh-fixing upper lid body 43a and the mesh-fixing lower lid body 45a. The ion exchanger filled cartridge 20a is a cartridge replaceably mounted on a metal removing column for removing metal in an organic solvent by an ion exchanger. The ion exchanger filled cartridge 20a has a cylinder portion 2a in which the granular ion exchange resin 1 is filled, an upper lid 3a provided on an upper end of the cylinder portion 2a and having the through hole 7 for a liquid to be treated formed, an upper-lid sandwiching member 351a screwed and fixed to an upper-lid sandwiching member fixing portion of the upper lid 3a, the mesh 9a sandwiched and fixed by the upper lid 3a and the upper-lid sandwiching member 351a, a lower lid 4a provided on the lower end of the cylinder portion 2a and having the through hole 8 for the treated liquid formed, the lower-lid sandwiching member 352a screwed and fixed to the lower-lid side sandwiching member fixing portion of the lower lid 4a, the mesh 10a sandwiched and fixed by the lower lid 4a and the lower-lid sandwiching member 352a, the insertion pipe 5 connected to the lower lid and inserted into the treated liquid discharge pipe provided on the bottom portion of the accommodating container of the metal removing column, and the granular ion exchange resin 1 filled inside the cylinder portion 2a. In order to seal a space between the inner wall of the treated liquid discharge pipe of the metal removing column and the outer side of the insertion pipe 5 of the ion exchanger filled cartridge 20a, the groove 51 for attaching the O-ring is formed on the outer side of the insertion pipe 5. The O-ring 6 is attached by being fitted in the groove 51 for attaching the O-ring.

That is, as the first embodiment of the ion exchanger filled cartridge of the present invention, the ion exchanger filled cartridge of the present invention having the upper-lid sandwiching member in which the passage port for the liquid to be treated is formed and the upper-lid side ion exchanger outflow preventing member, in which the upper-lid sandwiching member is made of the O-shaped outer side portion having a thread or a screw groove formed on the outer peripheral surface and the cross-shaped or X-shaped inner side portion provided on the inner side in the radial direction of the outer side portion;

the upper lid has the O-shaped upper-lid sandwiching member fixing portion having a screw groove or a thread screwed with a thread or a screw groove of the upper-lid sandwiching member formed on the inner peripheral surface;

the upper-lid sandwiching member is screwed with the upper-lid sandwiching member fixing portion; and the upper-lid sandwiching member is screwed and fixed to the upper-lid sandwiching member fixing portion so that the upper-lid side ion exchanger outflow preventing member is sandwiched and fixed by the upper lid and the upper-lid sandwiching member, can be cited.

Moreover, as the second embodiment of the ion exchanger filled cartridge of the present invention, the ion exchanger filled cartridge of the present invention having the lower-lid sandwiching member in which the passage port for the treated liquid is formed and the lower-lid side ion exchanger outflow preventing member, in which the lower-lid sandwiching member is made of the O-shaped outer side portion having a thread or a screw groove formed on the outer peripheral surface and the cross-shaped or X-shaped inner side portion provided on the inner side in the radial direction of the outer side portion;

the lower lid has the O-shaped lower-lid side sandwiching member fixing portion having a screw groove or a thread screwed with a thread or a screw groove of the lower-lid sandwiching member formed on the inner peripheral surface;

the lower-lid sandwiching member is screwed with the lower-lid side sandwiching member fixing portion; and the lower-lid sandwiching member is screwed and fixed to the lower-lid side sandwiching member fixing portion so that the lower-lid side ion exchanger outflow preventing member is sandwiched and fixed by the lower lid and the lower-lid sandwiching member, can be cited.

In the first embodiment of the ion exchanger filled cartridge of the present invention, since the center and its vicinity of the upper-lid side ion exchanger outflow preventing member is sandwiched by the upper lid and the upper-lid sandwiching member, the upper-lid side ion exchanger outflow preventing member is not dislocated easily. Moreover, in the second embodiment of the ion exchanger filled cartridge of the present invention, since the center and its vicinity of the lower-lid side ion exchanger outflow preventing member is sandwiched by the lower lid and the lower-lid sandwiching member, the lower-lid side ion exchanger outflow preventing member is not dislocated easily.

Figure 11:
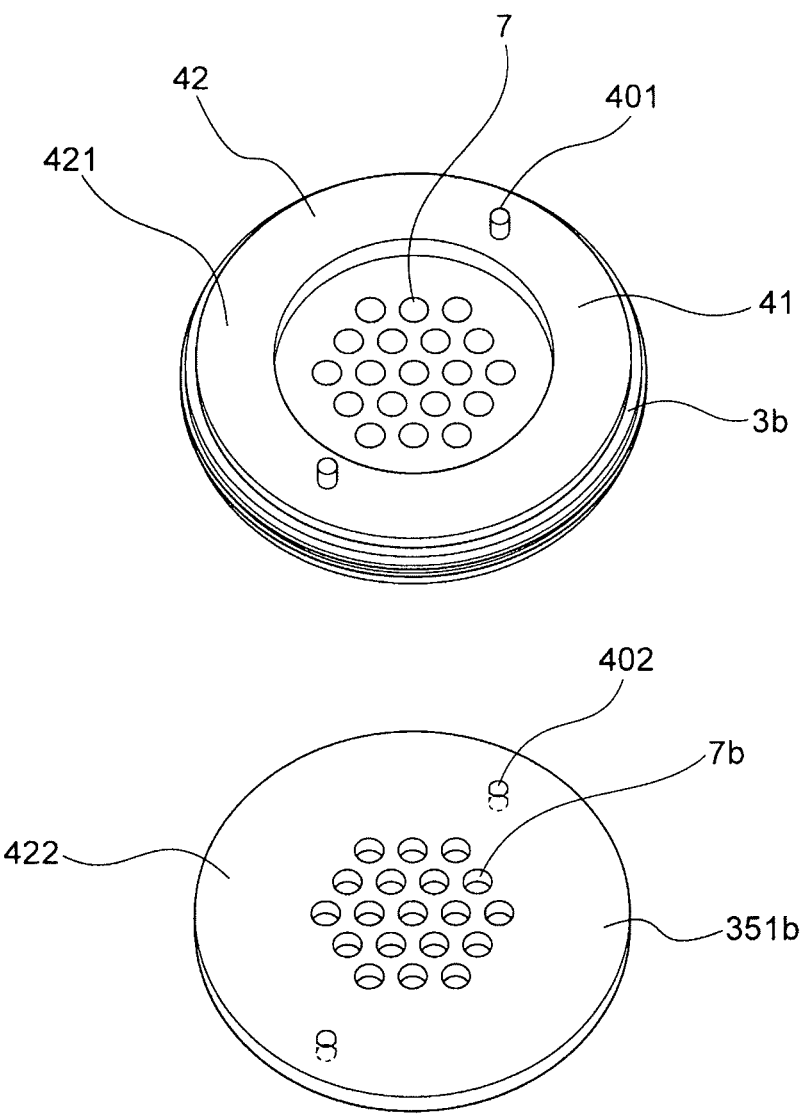
FIG. 11 is a schematic perspective view illustrating an embodiment of the upper lid having the upper-lid sandwiching member and the upper-lid sandwiching member fixing portion.
Figure 12:
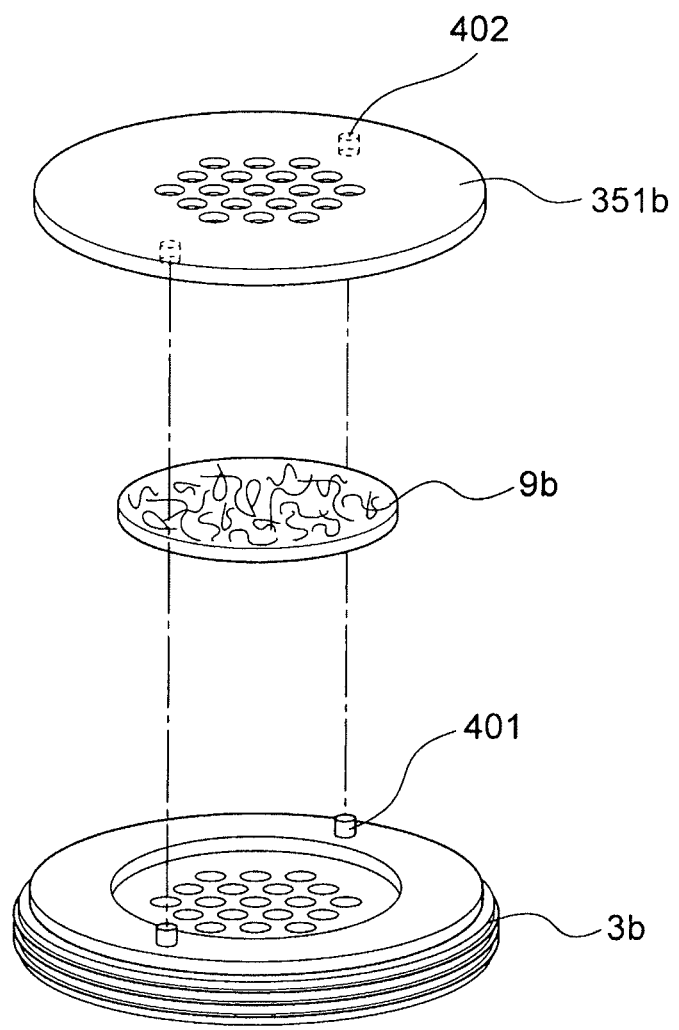
FIG. 12 is a schematic perspective view illustrating a state where the upper-lid side ion exchanger outflow preventing member is sandwiched by the upper lid having the upper lid having the upper-lid sandwiching member and the upper-lid sandwiching member fixing portion illustrated in FIG. 11.
Figure 13:
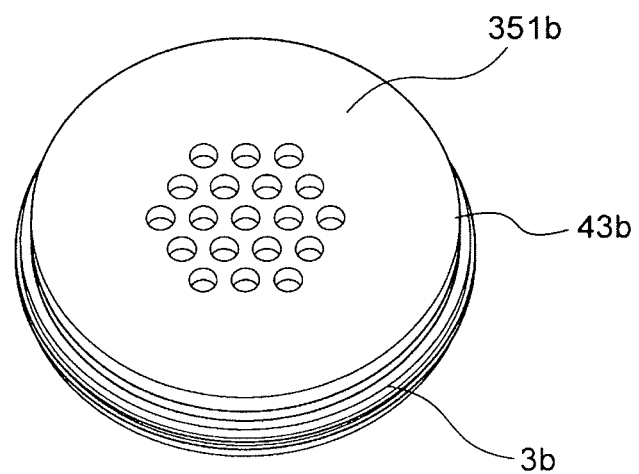
FIG. 13 is a schematic perspective view illustrating a state where the upper-lid side ion exchanger outflow preventing member is sandwiched and fixed by the upper lid having the upper-lid sandwiching member and the upper-lid sandwiching member fixing portion illustrated in FIG. 11.

As a method of attaching the ion exchanger outflow preventing member on the upper lid side in the first embodiment of the ion exchanger filled cartridge of the present invention, examples illustrated in FIGS. 11 to 13 are cited, for example. In FIGS. 11 to 13, a mesh 9b is sandwiched by an upper-lid sandwiching member 351b in which a fitting hole 402 is formed on a contact surface 422 side with the upper lid and an upper lid 3b having an O-shaped upper-lid side mesh holding portion 42 on which a fitting projection 401 is formed on a contact surface 421 with the upper-lid sandwiching member, and when the fitting projection 401 of the upper lid 3b is fitted in the fitting hole 402 of the upper-lid sandwiching member 351b, the mesh 9b is sandwiched and fixed by the upper lid 3b and the upper-lid sandwiching member 351b. A passage port 7b for the liquid to be treated is formed in the upper-lid sandwiching member 351b. Moreover, the through hole 7 for the liquid to be treated is formed in the upper lid 3b. As described above, a mesh fixing upper lid body 43b made of the upper lid 3b, the mesh 9b, and the upper-lid sandwiching member 351b is assembled, and the mesh fixing upper lid body 43b is screwed and fitted in the upper end side of the cylinder portion.

Figure 14:
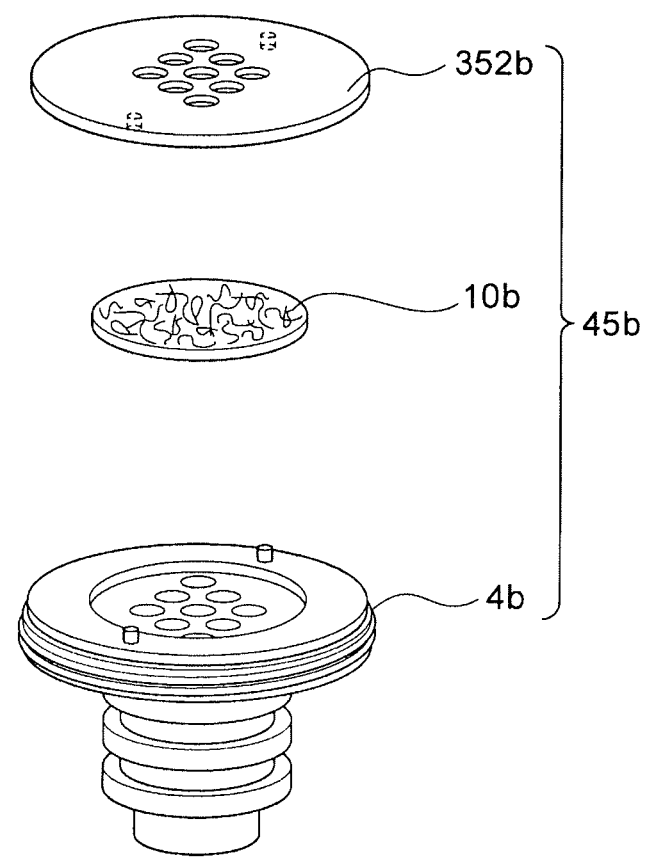
FIG. 14 is a schematic perspective view illustrating a state where the lower-lid side ion exchanger outflow preventing member is sandwiched by the lower lid having the lower-lid sandwiching member and the lower-lid side sandwiching member fixing portion.

As a method of attaching the lower-lid side ion exchanger outflow preventing member in the second embodiment of the ion exchanger filled cartridge of the present invention, an example illustrated in FIG. 14 is cited, for example. In FIG. 14, a mesh 10b is sandwiched by a lower-lid sandwiching member 352b in which a fitting hole is formed on a contact surface side with the lower lid and a lower lid 4b having an O-shaped lower-lid side mesh holding portion on which a fitting projection is formed on a contact surface with the lower-lid sandwiching member, and when the fitting projection of the lower lid 4b is fitted in the fitting hole of the lower-lid sandwiching member 352b, the mesh 10b is sandwiched and fixed by the lower lid 4b and the lower-lid sandwiching member 352b. A passage port for the treated liquid is formed in the lower-lid side sandwiching member 352b. Moreover, a through hole for the treated liquid is formed in the lower lid 4b. As described above, a mesh fixing lower lid body 45b made of the lower lid 4b, the mesh 10b, and the lower-lid sandwiching member 352b is assembled, and the mesh fixing lower lid body 45b is screwed and fitted in the lower end side of the cylinder portion.

The metal removing column of the present invention is a metal removing column having:

an accommodating container;

a supply port for liquid to be treated, formed in the accommodating container and supplying the liquid to be treated into the accommodating container;

a treated liquid discharge pipe attached to a bottom side of the accommodating container and communicating with an inside of the accommodating container; and an ion exchanger filled cartridge of the present invention, accommodated inside the accommodating container, in which the insertion pipe is inserted into the treated liquid discharge pipe, and an O-ring attached to an outer side of the insertion pipe is brought into close contact with an inner wall of the treated liquid discharge pipe and the outer side of the insertion pipe, whereby a space between an inner wall of the treated liquid discharge pipe and the outer side of the insertion pipe is sealed.

The metal removing column of the present invention is a metal removing column for removing metal impurities in an organic solvent and is a column in which the ion exchanger filled cartridge of the present invention is accommodated. And in the metal removing column of the present invention, an ion exchanger used for removal of the metal impurities in the organic solvent can be easily replaced by replacing the ion exchanger filled cartridge of the present invention accommodated therein.

The organic solvent treated by using the metal removing column of the present invention, that is, the liquids to be treated include IPA (isopropanol), PGMEA (propylene glycol monomethyl ether acetate), PGME (propylene glycol monomethyl ether), PGEE (propylene glycol monoethyl ether), NMP (N-methyl-2-pyrolidone) and the like. The impurities in the liquid to be treated include metal ions such as Li, Na, Mg, Al, K, Ca, Cr, Mn, Fe, Co, Ni, Cu, Cd, Pb and the like, anions such as Cl, $SO_4$, $NO_3$, $PO_4$, $CO_3$, $HCO_3$ and the like, organic acids such as formic acid, acetic acid, maleic acid, propionic acid and the like, and middle to high molecular mass compounds having positive or negative charges and the like.

The ion exchanger filled cartridge of the present invention is accommodated inside the accommodating container of the metal removing column of the present invention.

The accommodating container related to the metal removing column of the present invention is a member in which the ion exchanger filled cartridge of the present invention is accommodated. The size, the shape and the like of the accommodating container is selected as appropriate in accordance with the shape of the ion exchanger filled cartridge installed therein.

The supply port for the liquid to be treated for supplying the liquid to be treated into the accommodating container is formed in the accommodating container. A formation position and a size of the supply port for the liquid to be treated are selected as appropriate. Moreover, the liquid feed pipe for the liquid to be treated for conveying the liquid to be treated to the metal removing column is connected to the supply port for the liquid to be treated directly or through the connection pipe communicating with the supply port for the liquid to be treated.

The treated liquid discharge pipe communicating with the inside of the accommodating container is attached to the bottom side of the accommodating container. The liquid feed pipe for the treated liquid for conveying the treated liquid to the use point or the storage tank for the treated liquid is connected to the treated liquid discharge pipe.

The material of the accommodating container and the treated liquid discharge pipe is not particularly limited and includes polytetrafluoroethylene (PTFE), tetrafluoroethylene perfluoroalkyl vinyl ether copolymer (PFA), tetrafluoroethylene ethylene copolymer (ETFE), low-density polyethylene, high-density polyethylene and the like. The material of the accommodating container and the treated liquid discharge pipe is selected as appropriate in accordance with the type of the liquid to be treated, the type of a dissolved material and the like.

A particulate removing filter may be provided between the ion exchanger filled cartridge and the use point or the storage tank for the treated liquid. As an installation position, in the insertion pipe of the ion exchanger filled cartridge of the present invention, in the treated liquid discharge pipe and a position on a downstream of the end of the insertion pipe of the metal removing column of the present invention and the like are cited.

In the metal removing column of the present invention, the insertion pipe of the ion exchanger filled cartridge of the present invention is inserted into the treated liquid discharge pipe, and the space between the inner wall of the treated liquid discharge pipe of the metal removing column of the present invention and the outer side of the insertion pipe of the ion exchanger filled cartridge of the present invention is sealed by the O-ring attached to the outer side of the insertion pipe of the ion exchanger filled cartridge of the present invention, whereby the treated liquid treated by the ion exchanger filled in the ion exchanger filled cartridge of the present invention is discharged to the outside of the metal removing column of the present invention without being mixed with the liquid to be treated.

In the metal removing column of the present invention, replacement of the ion exchanger exceeding a use life can be carried out by replacing the ion exchanger filled cartridge of the present invention accommodated inside, and in the replacement of the ion exchanger filled cartridge of the present invention, a portion touched by the hand is the outer side of the cylinder portion in the ion exchanger filled cartridge of the present invention which on the upstream side of the filling region of the ion exchanger and thus, in the replacement of the ion exchanger, contamination on the portion (refinement system) on the downstream side of the filling region of the ion exchanger can be prevented.

Moreover, when the ion exchanger filled cartridge is to be installed in the metal removing column, it is necessary that an outlet of the treated liquid from the ion exchanger filled cartridge and the discharge pipe of the treated liquid of the metal removing column are connected to each other, and the space between the accommodating container of the metal removing column and the treated liquid discharge pipe is sealed so that the liquid to be treated in the accommodating container of the metal removing column does not leak to the treated liquid side and is not mixed in the treated liquid. In the metal removing column of the present invention, the insertion pipe which is the discharge pipe for the treated liquid from the ion exchanger filled cartridge is connected to the discharge pipe for the treated liquid of the metal removing column, and the space between the inner wall of the column of the treated liquid discharge pipe of the metal removing column and the outer side of the insertion pipe of the ion exchanger filled cartridge is sealed by the O-ring so that the liquid to be treated in the accommodating container of the metal removing column does not leak to the treated liquid side and is not mixed in the treated liquid. And since the O-ring is elastically deformed easily when it is sandwiched between the members to be sealed, even if the material of the insertion pipe of the ion exchanger filled cartridge and the material of the metal removing column are different, the O-ring is brought into close contact with the inner wall of the discharge pipe of the metal removing column and the outer side of the insertion pipe of the ion exchanger filled cartridge. As a result, the space between the inner wall of the treated liquid discharge pipe of the metal removing column and the outer side of the insertion pipe of the ion exchanger filled cartridge is sealed favorably.

On the other hand, when the outlet or the discharge pipe of the treated liquid of the ion exchanger filled cartridge and the outlet or the discharge pipe of the treated liquid of the metal removing column are connected by screwing, if the materials of the ion exchanger filled cartridge and the metal removing column are different, close contact of the screwing portions can be insufficient easily or close contact between the ion exchanger filled cartridge and the metal removing column can be insufficient easily. Thus, sealing between the outer side of the ion exchanger filled cartridge in the accommodating container of the metal removing column and the inside of the treated liquid discharge pipe in the metal removing column can be insufficient easily, and as a result, there is a concern that the liquid to be treated in the accommodating container of the metal removing column leaks to the treated liquid side and is mixed in the treated liquid.

Moreover, in the ion exchanger filled cartridge of the present invention, the insertion pipe having the O-ring attached thereto is provided on the lower side. Thus, the insertion pipe of the ion exchanger filled cartridge is not detached from the discharge pipe for the treated water of the metal removing column by the weight of the ion exchanger filled cartridge.

On the other hand, if the insertion pipe having the O-ring attached thereto is provided on the cylinder portion in which the ion exchangers are filled, the insertion pipe of the ion exchanger filled cartridge is detached from the discharge pipe for the treated water of the metal removing column by the weight of the ion exchanger filled cartridge. One of methods for preventing such an event is a method of connecting the outlet or the discharge pipe for the treated liquid of the ion exchanger filled cartridge and the outlet or the discharge pipe for the treated liquid of the metal removing column to each other by screwing, but then, the problem of insufficient close contact of the screwed portions screwed as above occurs. Alternatively, another preventing method includes a method of attaching a member for supporting the ion exchanger filled cartridge from below on the bottom portion of the metal removing column, but then, since an attached position of the support member is in the vicinity of the center of the lid of the ion exchanger filled cartridge, the support member closes the through hole for the water to be treated in the vicinity of the center of the lid, which hinders a favorable flow of the liquid to be treated at a center portion of the filling region of the ion exchanger.

In the ion exchanger filled cartridge of the present invention, the insertion pipe is provided on the lower side of the filling region of the ion exchanger. Thus, the water to be treated flows through the cylinder portion of the ion exchanger filled cartridge downward from above so as to press the ion exchanger downward. Thus, floating of the ion exchanger in the cylinder portion is prevented, whereby contact efficiency between the water to be treated and the ion exchangers becomes high.

EXAMPLE

Hereinafter, the present invention will be described in detail on the basis of an example. However, the present invention is not limited to the following example.

Example 1

An ion exchanger filled cartridge illustrated in FIG. 1 was installed in a PFA housing for demetallizing filter by Pall Corporation, and a metal removing column was assembled. Details of the filled ion exchanger and the O-ring are shown below, and the details of the ion exchanger filled cartridge are shown in Table 1. Moreover, as the liquid to be treated, isopropanol with metal impurity contents shown in Table 2 was prepared.

Subsequently, the liquid to be treated was supplied to the metal removing column at $SV-=4\ h^{-1}$, and metal removing treatment was carried out. The obtained metal impurity contents in the treated liquid are shown in Table 2.

<Ion Exchanger>

Product name made by Organo Corporation: Orlite® DS-7, Material of resin: styrene-divinylbenzene copolymer, Type of ion exchange group: mixed bed of sulfonate group, quaternary ammonium group, Ion exchange equivalent: cation 1.7 mg equivalent/ml wet resin, anion 0.8 mg equivalent/ml wet resin <O-Ring>

Product name made by Flon Industry: PFA coated O-ring, Material: Viton® coated with PFA, Line diameter: 3.53±0.10 mm, Inner diameter: 37.69±0.38 mm, Outer diameter: 44.75 mm

TABLE 1

| Material | PTFE |
|---|---|
| Cylinder portion | |
| Inner diameter (mm) | 75 |
| Outer diameter (mm) | 85 |
| Length (mm) | 225 |
| Upper lid | |
| Thickness (mm) | 10 |
| Diameter of through hole (mm) | 5 |
| Number of through holes | 37 |
| Lower lid | |
| Thickness (mm) | 10 |
| Diameter of through hole (mm) | 5 |
| Number of through holes | 19 |

TABLE 1-continued

| Material | PTFE |
|---|---|
| Insertion pipe | |
| Inner diameter (mm) | 33 |
| Outer diameter (mm) | 44 |

TABLE 2

| | Liquid to be treated | Treated liquid |
|---|---|---|
| Li | <10 | <10 |
| Na | 40893 | <10 |
| Mg | <10 | <10 |
| Al | <10 | <10 |
| K | 32 | <10 |
| Ca | 16 | <10 |
| Ti | <10 | <10 |
| Mn | <10 | <10 |
| Fe | <10 | <10 |
| Co | <10 | <10 |
| Ni | <10 | <10 |
| Cu | 24 | <10 |
| Zn | <10 | <10 |
| Sr | <10 | <10 |
| Cd | <10 | <10 |
| Ba | <10 | <10 |
| Pb | <10 | <10 |

REFERENCE SIGNS LIST 1 granular ion exchange resin
2, 2a cylinder portion
3, 3a, 3b upper lid
4, 4a, 4b lower lid
5 insertion pipe
6 O-ring
7 through hole for liquid to be treated
8 through hole for treated liquid
9, 9a, 9b mesh
10, 10a, 10b mesh
11, 11a upper-end side pipe-diameter reducing portion
12 lower-end side pipe-diameter reducing portion
20, 20a ion exchanger filled cartridge
21 accommodating container
22 supply port for liquid to be treated
23 treated liquid discharge pipe
24 inner wall of treated liquid discharge pipe
25 liquid feed pipe for treated liquid
26 liquid feed pipe for liquid to be treated
27 space between cylinder portion and accommodating container
28 connection pipe
30 metal removing column
31 liquid to be treated
32 treated liquid
33a upper-side cap member
33b lower-side cap member
36 upper-lid sandwiching member fixing portion
37 inner side portion of upper-lid sandwiching member
38 outer side portion of upper-lid sandwiching member
39 passage port for liquid to be treated
43a, 43b mesh-fixing upper lid body
45a, 45b mesh-fixing lower lid body
51 groove for attaching O-ring
351a, 351b upper-lid sandwiching member
352a, 352b lower-lid sandwiching member 401 fitting projection
402 fitting hole
421 contact surface of the upper lid with the upper-lid sandwiching member

The invention claimed is:

1. A cartridge accommodated inside an accommodating container of a metal-removing column comprising:
   a cylinder portion filled with at least one of an ion-exchange resin and a monolithic organic porous ion-exchanger;
   an upper lid in which a through hole for the liquid to be treated is formed and which is provided on an upper end of the cylinder portion;
   a lower lid in which a through hole for a treated liquid is formed and which is provided on a lower end of the cylinder portion;
   an insertion pipe connected to the lower lid, having an O-ring attached to an outer side, and inserted into a treated liquid discharge pipe provided on a bottom portion of the accommodating container of the metal removing column;
   an upper-lid sandwiching member in which a passage port for the liquid to be treated is formed; and
   an upper-lid side unwoven cloth or mesh,
   wherein the upper-lid side unwoven cloth or mesh is sandwiched between the upper lid and the upper-lid sandwiching member.

2. The cartridge according to claim 1, wherein the cylinder portion is made of polytetrafluoroethylene (PTFE).

3. The cartridge according to claim 1, wherein an upper-end side pipe-diameter reducing portion where the inner diameter of the cylinder portion decreases as it goes toward the upper end of the cylinder portion and a lower-end side pipe-diameter reducing portion where the inner diameter of the cylinder portion decreases as it goes toward the lower end of the cylinder portion are formed inside the cylinder portion.

4. The cartridge according to claim 1, wherein
   the upper-lid sandwiching member is made of an O-shaped outer side portion having a thread or a screw groove formed on an outer peripheral surface and a cross-shaped or X-shaped inner side portion provided on an inner side in a radial direction of the outer side portion;
   the upper lid has an upper-lid side sandwiching member fixing portion having a screw groove or a thread screwed with the thread or the screw groove of the upper-lid sandwiching member formed on an inner peripheral surface; and
   the upper-lid sandwiching member is screwed with the upper-lid side sandwiching member fixing portion.

5. A cartridge accommodated inside an accommodating container of a metal-removing column comprising:
   a cylinder portion filled with at least one of an ion-exchange resin and a monolithic organic porous ion-exchanger;
   an upper lid in which a through hole for the liquid to be treated is formed and which is provided on an upper end of the cylinder portion;
   a lower lid in which a through hole for a treated liquid is formed and which is provided on a lower end of the cylinder portion;
   an insertion pipe connected to the lower lid, having an O-ring attached to an outer side, and inserted into a treated liquid discharge pipe provided on a bottom portion of the accommodating container of the metal removing column;
   a lower-lid sandwiching member in which a passage port for the treated liquid is formed; and
   a lower-lid side unwoven cloth or mesh,
   wherein the lower-lid side unwoven cloth or mesh is sandwiched between the lower lid and the lower-lid sandwiching member.

6. The cartridge according to claim 5, wherein
   the lower-lid sandwiching member is made of an O-shaped outer side portion having a thread or a screw groove formed on an outer peripheral surface and a cross-shaped or X-shaped inner side portion provided on an inner side in a radial direction of the outer side portion;
   the lower lid has a lower-lid side sandwiching member fixing portion having a screw groove or a thread screwed with the thread or the screw groove of the lower-lid sandwiching member formed on an inner peripheral surface; and
   the lower-lid sandwiching member is screwed with the lower-lid side sandwiching member fixing portion.

7. A metal-removing column comprising:
   an accommodating container;
   a supply port for liquid to be treated formed in the accommodating container and supplying a liquid to be treated into the accommodating container;
   a treated liquid discharge pipe attached to a bottom side of the accommodating container and communicating with an inside of the accommodating container; and
   at least one of the ion-exchange resin and the monolithic organic porous ion-exchanger filled cartridge according to claim 1, accommodated inside the accommodating container, wherein
   the insertion pipe is inserted into the treated liquid discharge pipe, and
   the O-ring attached to the outer side of the insertion pipe is brought into close contact with an inner wall of the treated liquid discharge pipe and the outer side of the insertion pipe so that a space between the inner wall of the treated liquid discharge pipe and the outer side of the insertion pipe is sealed.

8. The metal-removing column according to claim 7, wherein
   a number of through holes provided on the upper end of the cylinder portion is greater than a number of through holes provided on the lower end of the cylinder portion.

* * * * *